United States Patent
Cuoq et al.

(10) Patent No.: US 12,233,357 B2
(45) Date of Patent: Feb. 25, 2025

(54) POLYETHYLENIMINE AS A NEW EMULSION BREAKER FOR QUENCH WATER SYSTEMS

(71) Applicant: Ecolab USA Inc., St. Paul, MN (US)

(72) Inventors: Fabrice Cuoq, Geleen (NL); Steven Leen, Geleen (NL)

(73) Assignee: Ecolab USA Inc., St. Paul, MN (US)

( * ) Notice: Subject to any disclaimer, the term of this patent is extended or adjusted under 35 U.S.C. 154(b) by 836 days.

(21) Appl. No.: 17/311,957

(22) PCT Filed: Dec. 12, 2018

(86) PCT No.: PCT/IB2018/059948
§ 371 (c)(1),
(2) Date: Jun. 8, 2021

(87) PCT Pub. No.: WO2020/121031
PCT Pub. Date: Jun. 18, 2020

(65) Prior Publication Data
US 2022/0062793 A1 Mar. 3, 2022

(51) Int. Cl.
*C10G 33/04* (2006.01)
*B01D 17/04* (2006.01)
(Continued)

(52) U.S. Cl.
CPC .......... *B01D 17/047* (2013.01); *C02F 1/682* (2013.01); *C08G 73/0206* (2013.01);
(Continued)

(58) Field of Classification Search
CPC .... B01D 17/047; C02F 1/682; C02F 2101/32; C02F 2103/365; C08G 73/0206; C10G 33/04
See application file for complete search history.

(56) References Cited

U.S. PATENT DOCUMENTS

| | | | |
|---|---|---|---|
| 4,537,701 | A | 8/1985 | Oppenlaender et al. |
| 5,294,347 | A | 3/1994 | Byrne et al. |

(Continued)

FOREIGN PATENT DOCUMENTS

| | | |
|---|---|---|
| CN | 105820833 | 8/2016 |
| CN | 108136278 | 6/2018 |

(Continued)

OTHER PUBLICATIONS

Souza et al ("Synthesis of Additives Based on Polyethylenimine Modified with Non-ionic Surfactants for Application in Phase Separation of Water in-Oil Emulsions", Energy Fuels 2017, 31). (Year: 2017).*

(Continued)

*Primary Examiner* — Robert S Jones, Jr.
*Assistant Examiner* — Jiangtian Xu
(74) *Attorney, Agent, or Firm* — Eric D. Babych; Barnes & Thornburg LLP

(57) ABSTRACT

Methods to increase the efficiency and throughput of hydrocarbon stream cracking by inhibiting the formation of, or resolving an emulsion, in an ethylene production quench water system. The method includes contacting a non-alkoxylated branched or linear polyethylenimine (PEI) with a quench water composition from the quench water system under conditions suitable to prevent the formation of an emulsion or to resolve the quench water composition into two immiscible phases.

17 Claims, 1 Drawing Sheet

(51) Int. Cl.
  *C02F 1/68* (2023.01)
  *C08G 73/02* (2006.01)
  *C02F 101/32* (2006.01)
  *C02F 103/36* (2006.01)

(52) U.S. Cl.
  CPC .......... *C10G 33/04* (2013.01); *C02F 2101/32* (2013.01); *C02F 2103/365* (2013.01)

(56) References Cited

U.S. PATENT DOCUMENTS

| | | | |
|---|---|---|---|
| 5,445,765 | A | 8/1995 | Elfers et al. |
| 5,759,409 | A | 6/1998 | Knauf et al. |
| 5,846,453 | A | 12/1998 | Mohr et al. |
| 2006/0289359 | A1* | 12/2006 | Manek .................. C02F 1/682 210/708 |
| 2017/0101589 | A1* | 4/2017 | Cuoq .................. B01D 17/047 |

FOREIGN PATENT DOCUMENTS

| | | |
|---|---|---|
| EP | 0541018 | 1/1996 |
| JP | H07310077 | 11/1995 |
| JP | 2012153809 | 8/2012 |
| WO | WO 2003/100169 | 12/2003 |

OTHER PUBLICATIONS

C1 Duan et al., "Treatment of wastewater produced from polymer flooding using polyoxyalkylated polyethyleneimine" *Separation and Purification Technology* 2014, 133, 160-167.

Fink, Johannes K., *Petroleum Engineer's Guide to Oil Field Chemicals and Fluids*. Gulf Professional Publishing, 2011, p. 88.

International Search Report and Written Opinion issued in Corresponding PCT application No. PCT/IB2018/05994B, dated Aug. 9, 2019.

Metzler R., et al., "Avoid Problems in Process Water Systems" RedOrbit, http://www.redorbit.com/news/science/1122677/avoid_problems_in_process_water_systems/. Accessed Jun. 11, 2021.

Wang et al., "Synthesis and evaluation of demulsifiers with polyethyleneimine as accepter for treating crude oil emulsions" *Polymers for advanced technologies* 2015, 26(5), 442-448.

* cited by examiner

POLYETHYLENIMINE AS A NEW EMULSION BREAKER FOR QUENCH WATER SYSTEMS

CROSS REFERENCE TO RELATED APPLICATIONS

This application is a national phase under 35 U.S.C. § 371 of International Application No. PCT/IB2018/059948, filed Dec. 12, 2018, the contents of which are incorporated into the present application in their entirety.

BACKGROUND OF THE INVENTION

A. Field of the Invention

The invention generally concerns methods to increase the efficiency of resolving emulsions. In particular, the invention concerns the use of a new emulsion breaker for hydrocarbon/water systems that inhibits the formation of emulsions and carry-over of hydrocarbon contaminants into the water system (e.g., dilutions steam systems (DSS), oil fields, and the like).

B. Description of Related Art

During routine operation of steam cracking systems in the petroleum industry, significant quantities of hydrocarbons and other contaminants can concentrate in the process water. These contaminants must be removed or controlled to minimize problems throughout the process water system. If unchecked, increased contamination can lead to fouling, foaming, corrosion and product quality issues. This is particularly common in olefins production, where the process water system can include a quench water tower (QWT), a process water stripper (PWS) to remove hydrocarbons, a waste-heat recovery system, or combinations thereof. Steam from the latter is sent to the pyrolysis furnace and is recovered as water in the quench tower. This complex water loop can experience a variety of problems due to contamination. By way of example, emulsions formed in a QWT and/or quench water settler (QWS) during gasoline/water separation can lead to high amounts of hydrocarbons sent with water to the PWS. This can result in fouling not only at the bottom of the stripper, but also at the dilution steam generator (DSG) preheaters which can effect throughput efficiency and, in worse cases, lead to plant shutdowns.

To improve gasoline/water separation in the QWT or QWS, it is possible to use emulsion breakers to improve water quality entering the dilution steam system (DSS). Two types of emulsion breaker have been typically employed in the petrochemical industry: 1) nonionic emulsion breakers that modify the wettability of the particles stabilizing the emulsion and 2) high molecular weight cationic emulsion breakers that enhance phase separation by bridging flocculation. Exemplary nonionic and mixed ionic emulsion breakers include those found in U.S. Pat. No. 5,846,453 to Mohr et al. and U.S. Pat. No. 5,445,765 to Elfers et al. Other ways to inhibit emulsion formation include inhibition of polymerization in the process water stripper (PWS) using stable free radical (SFR) type of inhibitors.

While various methods exist to reduce fouling in process water systems, there is still a need to further reduce emulsion formation to improve water quality entering the DSS and prolonged life and efficiency of stream petroleum cracking systems.

SUMMARY OF THE INVENTION

A discovery has been made that provides a solution to the deficiencies associated with the efficiency of steam cracking systems. The discovery is premised on a method of inhibiting the formation of, or resolving an emulsion, in an ethylene production quench water system using an emulsion breaker including non-alkoxylated branched or linear polyethylenimine (PEI). In particular, the method helps to inhibit the formation of an emulsion and thus carry-over of reactive monomers thereby improving the water quality entering the DSS. By way of example, aqueous phase of the quench water system can include a residual turbidity level of less than 60% after addition of 30 ppm or less of the PEI, preferably less than 20%, with a reduction of organic material by 30 to 90%. Consequently, a reduction of the accumulation of fouling not only improves the energy efficiency of the system, but also it prevents plant throughput reduction caused by fouling in the DSS.

Embodiments of the present invention describe methods of inhibiting the formation of, or resolving an emulsion, in an ethylene production quench water system. A method can include contacting a non-alkoxylated branched or linear polyethylenimine (PEI) with a quench water composition from the quench water system under conditions suitable to prevent the formation of an emulsion or to resolve the quench water composition into two immiscible phases. In one aspect, the PEI can include a molecular weight of 100 to 800,000 g/mol, 100 to 750,000 g/mol, 100 to 8000 g/mol, or 800 to 1300 g/mol. In other aspects, the quench water composition can include 0.01 to 30 ppm, preferably 0.01 to 10 ppm of the PEI. The PEI can be:

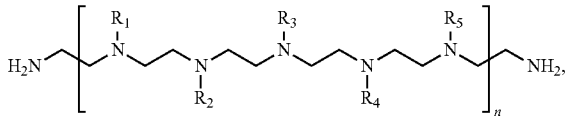

wherein: $R_1$-$R_5$ can be selected from the group consisting of hydrogen (H), $CH_2CH_2NH_2$, $CH_2CH_2NHCH_2CH_2NH_2$, $CH_2CH_2N(CH_2CH_2NH_2)_2$, $CH_2CH_2NHCH_2CH_2NH$ $(CH_2CH_2NH_2)$, $CH_2CH_2NHCH_2CH_2N(CH_2CH_2NH_2)_2$, $CH_2CH_2N(CH_2CH_2NH_2)(CH_2CH_2NHCH_2CH_2NH_2)$, $CH_2CH_2N(CH_2CH_2NH_2)(CH_2CH_2N(CH_2CH_2NH_2)_2)$, $CH_2CH_2N(CH_2CH_2NHCH_2CH_2NH_2)(CH_2CH_2N$ $(CH_2CH_2NH_2)_2)$, $CH_2CH_2N(CH_2CH_2NHCH_2CH_2NH_2)_2$ and $CH_2CH_2N(CH_2CH_2N(CH_2CH_2NH_2)_2)_2$; and n can be 1 to 500. In particular instances, the PEI is:

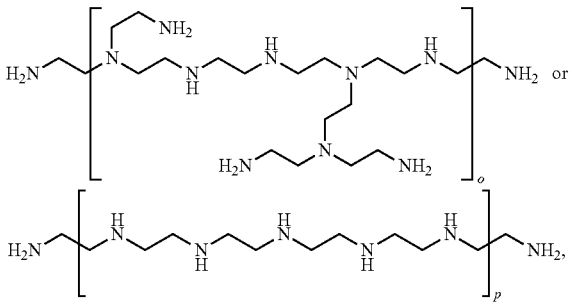

where o is at least 1, and p is at least 1. In some embodiments, o is 1 to 20. In another embodiment p is 1 to 30. In some aspects, the quench water system of the current method can further include one or more Quench Water Tower (QWT), Quench Water Loop (QWL), or Quench Water Settler (QWS), and the PEI can be added to a feed of the QWT, a feed of the QWL, a feed of the QWS, or any combination thereof. When the quench water system includes a QWT, the QWT can include a temperature of 25 to 150° C., preferably to 50 to 90° C. Other embodiments of the method are drawn the quench water composition of the present invention. In one aspect, the quench water composition can include gasoline hydrocarbons. In other aspects, one of the two immiscible phases can be an aqueous phase. The other phase can be an organic phase. The method can further include providing the aqueous phase to a process water stripper (PWS), a dilution steam generator preheater and/or a dilution steam generator. Without being limited by theory, the advantages of the present invention include inhibiting fouling of the PWS, dilution steam generator preheater, dilution steam generator, or any combination thereof. Specifically, a residual turbidity level of the aqueous phase of the quench water composition can be less than 60% after addition of 30 ppm or less of the PEI, preferably less than 20%. Typically, the aqueous phase of the quench water composition can include an organic material. In certain instances, the organic material can include reactive monomers and/or oligomers, such as indene and/or styrene derivatives. The methods of the current invention can result in a reduction of such organic material in the aqueous phase by 30 to 90%. Further aspects include providing a portion of the aqueous phase to the quench water system and fractionating of the organic phase. In a particular embodiment, the current invention includes a quench water composition used in the current methods used to increase the efficiency and throughput in hydrocarbon steam cracking systems.

In the context of the current invention, 20 embodiments are described. Embodiment 1 is a method of inhibiting the formation of, or resolving an emulsion, in an ethylene production quench water system, the method comprising contacting a non-alkoxylated branched or linear polyethylenimine (PEI) with a quench water composition from the quench water system under conditions suitable to prevent the formation of an emulsion or to resolve the quench water composition into two immiscible phases. Embodiment 2 is the method of embodiment 1, wherein the PEI comprises a molecular weight of 100 to 800000 g/mol, 100 to 750,000, 800 to 1300 g/mol. Embodiment 3 is the method of any one of embodiments 1 to 2, wherein the quench water composition comprises 0.01 to 30 ppm, preferably 0.01 to 10 ppm of the PEI. Embodiment 4 is the method of any one of embodiments 1 to 3, wherein the PEI is:

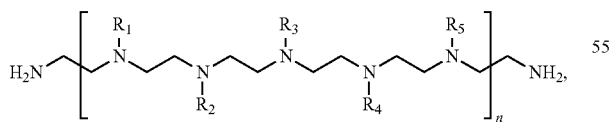

where: $R_1$ to $R_5$ are selected from the group consisting of hydrogen (H), $CH_2CH_2NH_2$, $CH_2CH_2NHCH_2CH_2NH_2$, $CH_2CH_2N(CH_2CH_2NH_2)_2$, $CH_2CH_2NHCH_2CH_2NH(CH_2CH_2NH_2)$, $CH_2CH_2NHCH_2CH_2N(CH_2CH_2NH_2)_2$, $CH_2CH_2N(CH_2CH_2NH_2)(CH_2CH_2NHCH_2CH_2NH_2)$, $CH_2CH_2N(CH_2CH_2NH_2)(CH_2CH_2N(CH_2CH_2NH_2)_2)$, $CH_2CH_2N(CH_2CH_2NHCH_2CH_2NH_2)(CH_2CH_2N(CH_2CH_2NH_2)_2)$, $CH_2CH_2N(CH_2CH_2NHCH_2CH_2NH_2)_2$ and $CH_2CH_2N(CH_2CH_2N(CH_2CH_2NH_2)_2)_2$; and n is at least 1. Embodiment 5 is the method of any one of embodiments 1 to 4, wherein the PEI is:

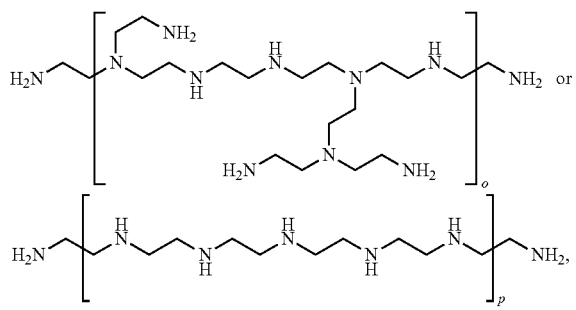

where: o is at least 1, and p is at least 1. Embodiment 6 is the method of any one of embodiments 1 to 5, wherein the quench water system further comprises one or more Quench Water Tower (QWT), Quench Water Loop (QWL), or Quench Water Settler (QWS). Embodiment 7 is the method of embodiment 6, wherein the method comprises adding the PEI to a feed of the QWT, a feed of the QWL, a feed of the QWS, or any combination thereof. Embodiment 8 is the method of any one of embodiments 6 to 7, wherein the QWT comprises a temperature of 25 to 150° C., preferably to 50 to 90° C. Embodiment 9 is the method of any one of embodiments 1 to 8, wherein the quench water composition comprises gasoline hydrocarbons. Embodiment 10 is the method of any one of embodiments 1 to 9, wherein one of the two immiscible phases is an aqueous phase. Embodiment 11 is the method of any one of embodiment 10, further comprising providing the aqueous phase to a process water stripper (PWS). Embodiment 12 is the method of any one of embodiments 10 to 11, further comprising providing the aqueous phase to a dilution steam generator preheater and/or a dilution steam generator. Embodiment 13 is the method of any one of embodiments 10 to 12, further comprising inhibiting fouling of the PWS, dilution steam generator preheater, dilution steam generator, or any combination thereof. Embodiment 14 is the method of any one of embodiments 10 to 13, wherein a residual turbidity level of the aqueous phase is less than 60% after addition of 30 ppm or less of the PEI to the quench water composition, preferably less than 20%. Embodiment 15 is the method of any of embodiments 10 to 14, wherein the aqueous phase comprises an organic material. Embodiment 16 is the method of embodiment 15, wherein the organic material comprises indene and/or styrene derivatives. Embodiment 17 is the method of embodiment 15, wherein a reduction of the organic material in the aqueous phase is 30 to 90%. Embodiment 18 is the method of any one of embodiments 10 to 17, further comprising providing a portion of the aqueous phase to the quench water system. Embodiment 19 is the method of any one of embodiments 1 to 18, wherein one of the two immiscible phases is an organic phase and the method further comprises fractionating the organic phase. Embodiment 20 is a quench water composition comprising a non-alkoxylated branched or linear polyethylenimine (PEI) and water.

The following includes definitions of various terms and phrases used throughout this specification.

The term "cracking" means to break a carbon-carbon bond of a hydrocarbon molecule to produce a hydrocarbon having fewer carbon atoms than the starting hydrocarbon molecule.

The term "gasoline hydrocarbons" refers to a hydrocarbons stream containing hydrocarbons having 12 carbons suitable to be made into gasoline. For example, $C_5+$ gasoline hydrocarbons refer to a hydrocarbons stream having $C_5$ to $C_{12}$ hydrocarbons. Trace amounts of higher hydrocarbons can be present.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The processes of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the non-alkoxylated, branched or linear PEI emulsion breakers of the present invention are their abilities to prevent the formation of an emulsion or to resolve a quench water composition into two immiscible phases.

Other objects, features, and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
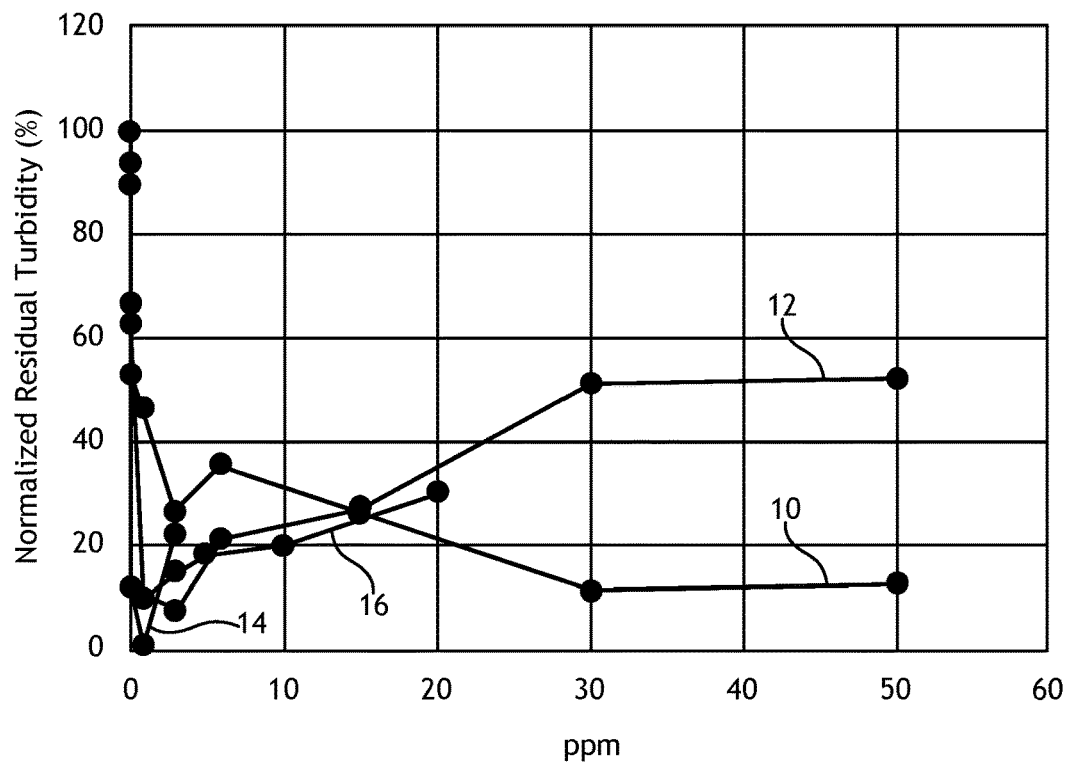
FIG. 1 shows the turbidity results from bottle tests of the PEI emulsion breakers of the present invention and a comparative emulsion breaker.

While the invention is susceptible to various modifications and alternative forms, specific embodiments thereof are shown by way of example in the drawings. The drawings may not be to scale.

DETAILED DESCRIPTION OF THE INVENTION

A method of inhibiting the formation of, or resolving, an emulsion in an ethylene production quench water system using an emulsion breaker including a non-alkoxylated branched or linear polyethylenimine (PEI) has been discovered. The method not only improves the overall energy efficiency of cracking systems, but can also increase plant throughput by increasing process water quality, which decreases equipment fouling.

These and other non-limiting aspects of the present invention are discussed in further detail in the following sections.

A. Emulsion Breaker

The petroleum emulsion breakers provide not only efficiently break water-in-oil emulsions, but also result in the separated water having a minimum remaining oil content. The emulsion breaker of the current invention includes a non-alkoxylated branched or linear polyethylenimine (PEI). PEI or sometimes known as a polyaziridine is a polymer with repeating amine groups tethered by ethylene spacers typically prepared by the ring opening polymerization of aziridine. Alkoxylated PEI includes PEI that is further modified with oxygenated alkyl groups typically prepared by alkoxylation of PEI with oxygenates. The PEI of the current invention is not alkoxylated (i.e., non-alkoxylated). PEI can typically be used in a wide range of applications (e.g., detergents, adhesives, water treatment agents, cosmetics, etc.). Linear PEIs can contain secondary amines and branched PEIs can contain primary, secondary, and/or tertiary amino groups. The degree of branching can be controlled by the reactions condition employed (e.g., temperature, concentration, duration) and further functionalization can be achieved through chemical post-modification (e.g., amine alkylation, acylation, condensation, sulfonylation, etc.). The PEI can have a molecular weight of 100 to 800,000 g/mol, 100 to 750,000, 100 to 8000 g/mol, or 800 to 1300 g/mol, and all values and ranges there between (e.g., 100, 200, 300, 400, 500, 600, 700, 800, 900, 1000, 1100, 1200, 1300, 1400, 1500, 2000, 2500, 3000, 3500, 4000, 4500, 5000, 5500, 6000, 6500, 7000, 7500, 8000, 9000, 10000, 20000, 30000, 40000, 50000, 60000, 70000, 80000, 90000, 100000, 110000, 120000, 130000, 140000, 150000, 200000, 300000, 400000, 500000, 600000, 70000, and 800000 g/mol). The PEI can have the structure:

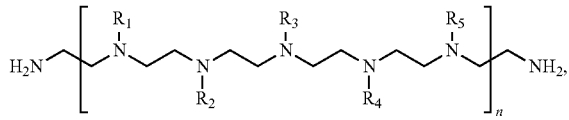

wherein: $R_1$-$R_5$ can be hydrogen (H), an alkyl group, or a substituted alkyl group; and n can be at least 1, or 1 to 1,000, or at least any one of, equal to any one of, or between any two of 1, 10, 20, 30, 40, 50, 60, 70, 80, 90, 100, 110, 150, 200, 250, 300, 350, 400, 450 500, 550, 600, 650, 700, 750, 800, 850, 900, 950, and 1000. It should be understood than n is a number sufficient to produce a PEI having a desired molecular weight for example, between 100 and 800,000 g/mol. An alkyl group can include a saturated, monovalent unbranched or branched hydrocarbon chain. Exemplary alkyl groups having 1 to 20 carbon atoms can includes, but are not limited to, methyl, ethyl, n-propyl, isopropyl, n-butyl, isobutyl, sec-butyl, tert-butyl, 1-pentyl, 2-pentyl, 3-pentyl, 3-methyl-1-butyl, 2-methyl-1-butyl, 2,2-dimethyl-1-propyl, 3-ethyl-2-butyl, 2-methyl-2-butyl, 1-hexyl, 2-hexyl, 3-hexyl, 1-heptyl, 2-heptyl, 3-heptyl, 4-heptyl, 1-octyl, 2-octyl, 3-octyl, 4-octyl, 2-ethylhexyl, 1,1,3,3-tetramethylbutyl, nonyl, decyl, dodecyl, tetradecyl, hexadecyl, octadecyl, eicosyl, cyclohexyl, cyclopentyl, benzyl, etc. A substituted alkyl group can include any of the aforementioned alkyl groups that are additionally substituted with one or more heteroatoms, such as a halogen (e.g., F, Cl, Br, I), boron, oxygen, nitrogen, sulfur, silicon, etc. Without limitation, the substituted alkyl group of the present invention can include an alkylamine, which can refer to a straight or branched chain alkylamine having 1 to 10 carbon atoms, for example, $CH_2NH_2$, $CH_2CH_2NH_2$, $CH_2CH_2CH_2NH_2$, $CH_2CH(NH_2)CH_3$, $CH_2CH_2CH_2CH_2NH_2$, $CH_2CH_2CH(NH_2)CH_3$, $CH_2CH(NH_2)CH_2CH_3$, $CH_2CH_2CH_2CH_2CH_2NH_2$, $CH_2CH_2CH_2CH(NH_2)CH_3$, $CH_2CH_2CH_2CH(NH_2)$ $CH_3$, $CH_2CH_2CH(NH_2)CH_2CH_3$, $CH_2CH(NH_2)$ $CH_2CH_2CH_3$, $CH_2CH_2CH_2CH_2CH_2CH_2NH_2$, $CH_2CH_2CH_2CH_2CH(NH_2)CH_3$, $CH_2CH_2CH_2CH_2CH(NH_2)CH_3$, $CH_2CH_2CH_2CH(NH_2)CH_2CH_3$, $CH_2CH_2CH(NH_2)CH_2CH_2CH_3$, $CH_2CH(NH_2)$ $CH_2CH_2CH_2CH_3$, etc. The alkylamine can further include mono- or di-substituted alkyl and/or substituted alkyl chains mentioned above attached to the nitrogen atom of the amine. Preferably, the substituted alkyl group can be a cumulative reaction derivative of the ring opening polymerization of aziridine reaction that includes $CH_2CH_2NH_2$, $CH_2CH_2NHCH_2CH_2NH_2$, $CH_2CH_2N(CH_2CH_2NH_2)_2$, $CH_2CH_2NHCH_2CH_2NH$ $(CH_2CH_2NH_2)$, $CH_2CH_2NHCH_2CH_2N(CH_2CH_2NH_2)_2$, $CH_2CH_2N(CH_2CH_2NH_2)$ $(CH_2CH_2NHCH_2CH_2NH_2)$, $CH_2CH_2N(CH_2CH_2NH_2)$ $(CH_2CH_2N(CH_2CH_2NH_2)_2)$, $CH_2CH_2N$ $(CH_2CH_2NHCH_2CH_2NH_2)(CH_2CH_2N(CH_2CH_2$ $NH_2)_2)$, $CH_2CH_2N(CH_2CH_2NHCH_2CH_2NH_2)_2$ and $CH_2CH_2N(CH_2CH_2N(CH_2CH_2NH_2)_2)_2$. Without being limited by theory, the PEI polymer can include aziridine end groups. Exemplary PEI for used as an emulsion breaker of the present invention can include:

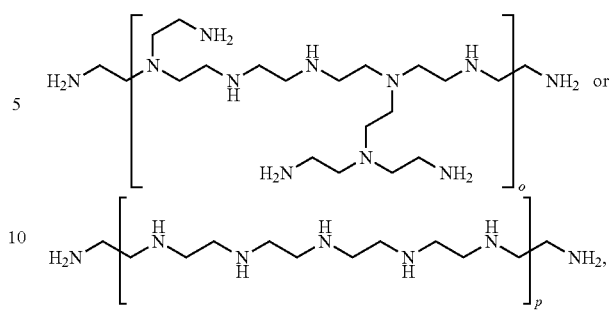

wherein o can be at least or 1 to 1,000 and all values and ranges there between (e.g., 1, 2, 3, 4, 5, 6, 7, 8, 9, 10, 11, 12, 13, 14, 15, 16, 17, 18, 19, 20, 50, 100, 150, 200, 250, 300, 400, 500, 600, 700, 800, 900, 1000), and p can be at least 1, or 1 to 1,000 and all values and ranges there between (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 50, 100, 150, 200, 250, 300, 350, 400, 450, 500, 550, 600, 650, 700, 750, 800, 850, 900, 950 and 1000). It should be understood than o and/or p are numbers sufficient to produce a PEI having a desired molecular weight for example, between 100 and 800, 000 g/mol. In some embodiments, o is 1 to 20 and/or p is 1 to 30. Linear and branched PEIs can be purchased from commercial manufactures such as Sigma-Aldrich®, USA.

B. Methods of Use

In quench water systems, emulsion problems can be aggravated by: 1) fluctuation in the quench water pH below 4.0 and above 8.0; 2) liquid feedstocks and heavier liquefied petroleum gas (LPG) feedstocks such as butane; 3) high throughput rate and increased turbulence; and 4) furnace operation cycling (e.g., during decoking). The present invention provides a method for the demulsification of petroleum emulsions in which the emulsion can be treated with an emulsion breaker that inhibits the formation of, or resolves an emulsion, in a hydrocarbon production quench water system. The method can include contacting a non-alkoxylated branched or linear polyethylenimine (PEI) with a quench water composition from the quench water system under conditions suitable to prevent the formation of an emulsion or to resolve the quench water composition into two immiscible phases. Preferably the hydrocarbon production quench water system is utilized for the production of alkenes (e.g., ethylene, propylene, butylenes, etc.) from gasoline hydrocarbons. Gasoline hydrocarbons can include mixtures of hydrocarbons with between 4 and 12 carbons ($C_4$-$C_2$) per molecule. Exemplary gasoline hydrocarbons include paraffins (alkanes), cycloalkanes (naphthalenes), and olefins (alkenes). While quench water systems are described, it should be understood that the emulsion breaker can be used in other hydrocarbon/water systems. By way of example, hydrocarbon/water systems from hydrocarbon production from a subsurface formation) can be treated.

The quench water system can include any of the components apparent to those having ordinary skill in the art for use during hydrocarbon cracking. In some embodiments, the quench water system can include one or more Quench Water Towers (QWT), Quench Water Loops (QWL), or Quench Water Settlers (QWS), and the non-alkoxylated PEI can be added to a feed of the QWT, a feed of the QWL, a feed of the QWS, or any combination thereof. The quench water composition can be any aqueous petrochemical composition applicable to steam cracking systems known to those having ordinary skill in the art that utilize a quench water system. In preferred aspects, the quench water composition includes an organic phase and an aqueous phase that are immiscible with each other wherein the non-alkoxylated linear or branched PEI emulsion breaker promotes the longevity of this immiscibility during continued cracking operation. The emulsion breaker can be added to a feed stream entering a quench water component, directly to the component, or both. The organic phase can include gasoline hydrocarbons and the aqueous phase can be transferred to a process water stripper (PWS), a dilution steam generator preheater and/or a dilution steam generator. The advantages of the present invention include inhibiting fouling of the PWS, dilution steam generator preheater, dilution steam generator, or any combination thereof.

The quench water compositions of the current methods can be used to increase the efficiency and throughput in hydrocarbon steam cracking systems. The currently employed non-alkoxylated branched or linear PEI emulsion breakers can be more efficient than using other known treatments, such as heavy amine treatment. Additionally, the current methods can be more efficient than dosing an inhibitor in the process water stripper (PWS) as temperatures within the PWS can be high and complete polymerization inhibition might not be reached. In this scenario, decreasing the amount of contamination going to the PWS could be beneficial. In another instance of using the current non-alkoxylated branched or linear PEI emulsion breakers, a similar efficiency compared to acid dosing in the QWT can be achieved. The use of acid can decrease the pH in the QWT which can also improve gasoline/water separation. However, the high amounts of acid required to normalize QWT pH and consequent downstream neutralization could increase overall operational costs.

It is anticipated that the quench water composition can include a broad range of non-alkoxylated PEI with lower risk of overdosing. The resulting quench water composition that is contacted with non-alkoxylated branched or linear PEI emulsion breaker of the present invention to inhibit the formation of, or resolves an emulsion can include 0.01 to 30 ppm, preferably 0.01 to 10 ppm and all value or ranges there between (e.g., 0.02, 0.03, 0.04, 0.05, 0.06, 0.07, 0.08, 0.09, 0.1, 0.15, 0.2, 0.3, 0.4, 0.5, 1, 2, 3, 4, 5, 6, 7, 8, or 9 ppm) of the non-alkoxylated PEI. In certain aspects, the quench water system includes a QWT and the QWT can include a temperature of 25 to 150° C., preferably to 50 to 90° C. and all values and ranges there between (e.g., 55, 60, 65, 70, 75, 80, 85, 90, or 95° C.).

The non-alkoxylated branched or linear PEI emulsion breakers of the current invention can be used to decrease the residual turbidity of the aqueous phase of the aqueous phase of the quench water composition. The residual turbidity level can be less than 60% after addition of 30 ppm or less of the non-alkoxylated branched or linear PEI, preferably less than 20%, 19%, 18%, 17%, 16%, 15%, 14%, 13%, 12%, 11%, 10%, 9%, 8%, 7%, 6%, 5%, 4%, 3%, 2%, or 1%. Typically, the aqueous phase of the quench water composition can include an organic material. In certain instances, the organic material can include reactive monomers and/or oligomers, such as indene and/or styrene derivatives. The methods of the current invention can result in a reduction of such organic material in the aqueous phase by 30 to 90% and all values and ranges there between (e.g., 35, 40, 45, 50, 55, 60, 65, 70, 75, 80, 85, 90, or 95%). Further aspects can include providing a portion of the aqueous phase to the quench water system and fractionating of the organic phase.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Branched PEI (average Mw ~800 by LS, average Mn ~600 by GPC), branched PEI (average Mn ~1,200, average Mw ~1300 by LS, 50 wt. % in $H_2O$), and branched PEI (average Mn ~60,000 by GPC, average Mw ~750,000 by LS, 50 wt. % in $H_2O$) were obtained from Sigma-Aldrich® (U.S.A.). Reagents were used as obtained.

Example 1

(Bottle Tests)

Bottle tests were performed using process water and gasoline from the quench water tower (QWT) of a naphtha olefin cracker. Process water (10 mL) and gasoline (10 mL) were added to vials containing different concentrations of emulsion breaker (e.g., 0 to 50 ppm). The vials were hand-shaken at room temperature and the turbidity of the water was measured. Lower residual turbidity values were desired.

FIG. 1 shows the turbidity results from the bottle tests in Example 1. Branched PEI data points 10 (Mw ~800 g/mol), 12 (Mw ~1300 g/mol), 14 (Mw ~750,000 g/mol) of the present invention, and comparative sample 16 (commercial non-PEI emulsion breaker A) were tested at several ppm (e.g., 0 to 50 ppm). From the results it was determined that the non-alkoxylated branched or linear PEI emulsion breakers had a normalized residual turbidity that was lower than Commercial non-PEI emulsion breakers A. Furthermore, the comparative same 16 contained polyepichlorhydrin and trimethylamine, which can also contribute to the corrosion potential of this additive.

Example 2

(Demulsification Tests)

Demulsification tests were performed using process water and gasoline from the quench water tower (QWT) of a naphtha olefin cracker. Process water (60 mL) and gasoline (60 mL) were added to multiple vessels and each vessel was heated at 80° C. for 30 min. After cooling the mixtures where then stirred at 1000 rpm for 5 min and then added different concentrations of emulsion breaker (e.g., 0, 1, 5, and 10 ppm) followed by stirring for an additional 15 min and then the stirring is stopped. After complete demulsification, the turbidity of each water phase was measured. The lower the residual turbidity, the better the demulsification.

Figure 2:
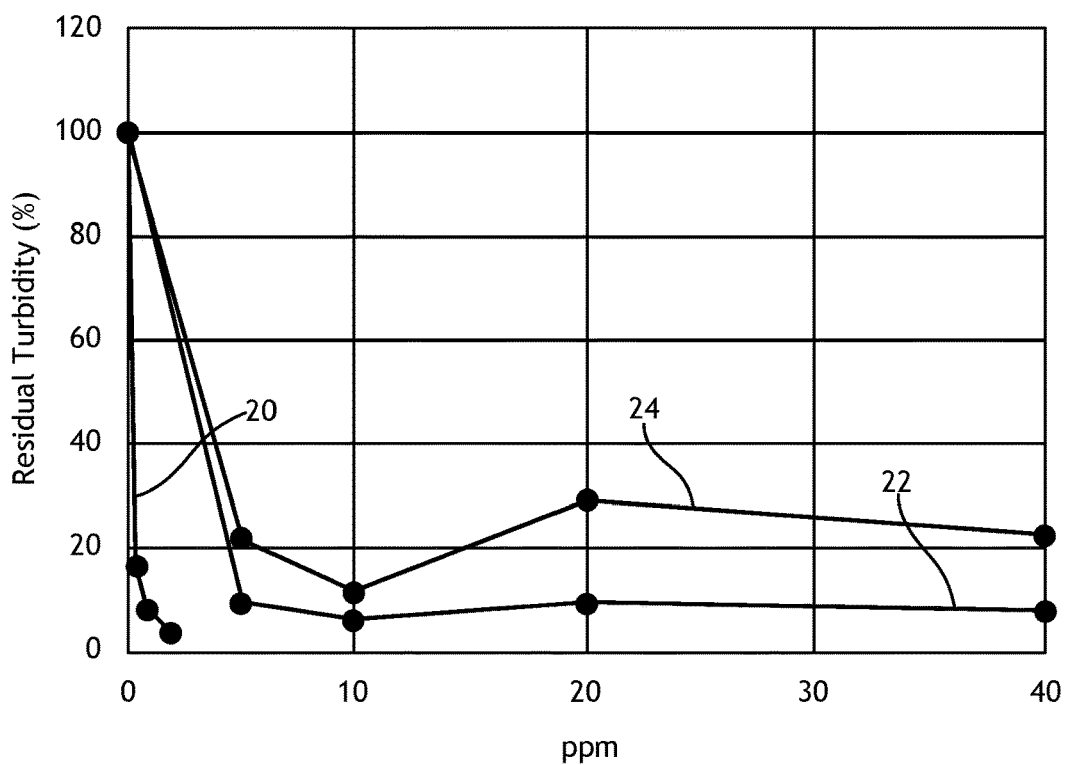
FIG. 2 shows the turbidity results from de-emulsification tests of a branched PEI emulsion breaker of the present invention and two comparative emulsion breakers.

FIG. 2 shows the turbidity results of branched PEI 20 (Mw ~1300 g/mol) of the present invention, comparative sample 22 (commercial non-PEI emulsion breaker A), and comparative sample 24, (commercial non-PEI emulsion breaker B). The branched PEI 20 reached lower residual turbidity levels, which makes the material more suitable for treating process water systems suffering from emulsion issues with decreasing the risk of increasing emulsion by overdosing than the commercial product.

The invention claimed is:

1. A method of inhibiting the formation of, or resolving an emulsion, in an ethylene production quench water system, the method comprising contacting a non-alkoxylated branched or linear polyethylenimine (PEI) with a quench water composition from the quench water system under conditions suitable to prevent the formation of an emulsion or to resolve the quench water composition into two immiscible phases, wherein the PEI is:

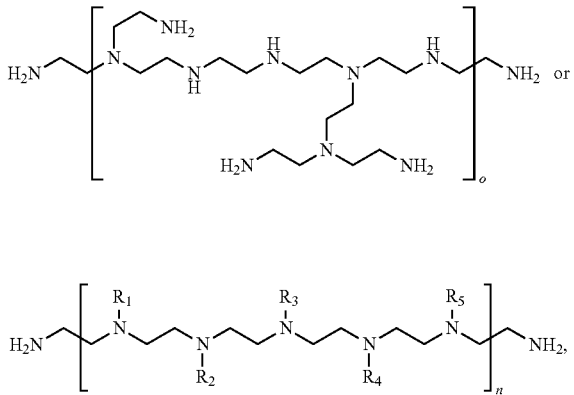

where:

o is at least 1;

R₃ is H;

R₁, R₂, R₄, and R₅ are selected from the group consisting of hydrogen (H), CH₂CH₂NH₂, CH₂CH₂NHCH₂CH₂NH₂, CH₂CH₂N(CH₂CH₂NH₂)₂, CH₂CH₂NHCH₂CH₂NH(CH₂CH₂NH₂), CH₂CH₂NHCH₂CH₂N(CH₂CH₂NH₂)₂, CH₂CH₂N(CH₂CH₂NH₂)(CH₂CH₂NHCH₂CH₂NH₂), CH₂CH₂N(CH₂CH₂NH₂)(CH₂CH₂N(CH₂CH₂NH₂)₂), CH₂CH₂N(CH₂CH₂NHCH₂CH₂NH₂)(CH₂CH₂N(CH₂CH₂NH₂)₂), CH₂CH₂N(CH₂CH₂NHCH₂CH₂NH₂)₂ and CH₂CH₂N(CH₂CH₂N(CH₂CH₂NH₂)₂)₂; and n is at least 1.

2. The method of claim 1, wherein the PEI comprises a molecular weight of 100 to 800,000 g/mol.

3. The method of claim 1, wherein the quench water composition comprises 0.01 to 30 ppm of the PEI.

4. The method of claim 1, wherein the PEI is:

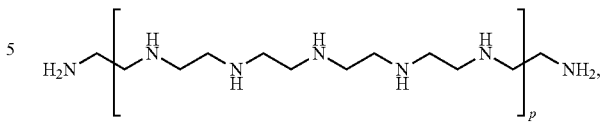

where:

p is at least 1.

5. The method of claim 1, wherein the quench water system further comprises one or more of a Quench Water Tower (QWT), a Quench Water Loop (QWL), or a Quench Water Settler (QWS).

6. The method of claim 5, wherein the method comprises adding the PEI to a feed of the QWT, a feed of the QWL, a feed of the QWS, or any combination thereof.

7. The method of claim 5, wherein the QWT comprises a temperature of 25 to 150° C.

8. The method of claim 1, wherein the quench water composition comprises gasoline hydrocarbons.

9. The method of claim 1, wherein one of the two immiscible phases is an aqueous phase.

10. The method of claim 9, further comprising providing the aqueous phase to a process water stripper (PWS), a dilution steam generator preheater, and/or a dilution steam generator.

11. The method of claim 10, further comprising inhibiting fouling of the PWS, the dilution steam generator preheater, the dilution steam generator, or any combination thereof.

12. The method of claim 9, wherein a residual turbidity level of the aqueous phase is less than 60% after addition of 30 ppm of the PEI to the quench water composition.

13. The method of claim 9, wherein the aqueous phase comprises an organic material.

14. The method of claim 13, wherein the organic material comprises indene and/or styrene derivatives.

15. The method of claim 13, wherein a reduction of the organic material in the aqueous phase is 30 to 90%.

16. The method of claim 9, further comprising providing a portion of the aqueous phase to the quench water system.

17. The method of claim 1, wherein one of the two immiscible phases is an organic phase and the method further comprises fractionating the organic phase.

* * * * *